United States Patent [19]

Binkley et al.

[11] Patent Number: 4,930,484
[45] Date of Patent: Jun. 5, 1990

[54] FUEL AND AIR MIXTURE EXPANDING AND PREHEATING SYSTEM

[76] Inventors: Steven M. Binkley, 424 Stadium Dr., Apt. O-3; Clinton D. McCarty, 424 Stadium Dr., Apt. L-2, both of Ada, Okla. 74820

[21] Appl. No.: 426,665

[22] Filed: Oct. 26, 1989

[51] Int. Cl.[5] .............................................. F02M 31/00
[52] U.S. Cl. ..................................... 123/546; 123/543
[58] Field of Search ................ 123/557, 546, 543, 547

[56] References Cited

U.S. PATENT DOCUMENTS

| | | |
|---|---|---|
| 3,221,719 | 12/1965 | Ulrich . |
| 3,872,849 | 3/1975 | Chester et al. . |
| 4,029,065 | 6/1977 | Wood . |
| 4,086,893 | 5/1978 | Bernecker . |
| 4,100,899 | 8/1978 | Chilton ............................. 123/546 |
| 4,194,476 | 3/1980 | Lombardi et al. . |
| 4,312,318 | 1/1982 | Davis et al. ....................... 123/546 |
| 4,388,910 | 6/1983 | Birdwell ............................ 123/546 |

Primary Examiner—Andrew M. Dolinar
Assistant Examiner—M. Macy
Attorney, Agent, or Firm—Jerry T. Kearns

[57] ABSTRACT

A fuel and air mixture expanding and preheating system for use in a vehicle having an internal combustion engine, an intake manifold, a carburetor, an automatic transmission and a transmission fluid cooler includes a heat exchanger body having a first mounting plate dimensioned for attachment to the carburetor and a second mounting plate dimensioned for attachment to the intake manifold. A heating fluid inlet of the heat exchanger body is dimensioned for connection to a heated automatic transmission fluid line of the vehicle, between the automatic transmission and the transmission fluid cooler. A heating fluid outlet of the heat exchanger body is dimensioned for connection to a transmission fluid cooler inlet of the vehicle. A throttle valve is mounted in an outlet portion of the heat exchanger body, adjacent the intake manifold mounting plate. In use, the fuel and air mixture from the carburetor is heated and expanded in the heat exchanger body prior to induction into the intake manifold of the internal combustion engine. The heat is extracted from the automatic transmission fluid of the vehicle, resulting in a cooler operating temperature for the vehicle transmission. The heat exchanger body includes an internal fluid reservoir having a hollow spiral fin in fluid communication with the reservoir. The fuel and air mixture is thus forced to follow a helical flow path in the heat exchanger body for maximum heat transfer efficiency.

14 Claims, 3 Drawing Sheets

FUEL AND AIR MIXTURE EXPANDING AND PREHEATING SYSTEM

BACKGROUND OF THE INVENTION

1. Field of the Invention

The present invention relates to fuel and air mixture expanding and preheating systems, and more particularly pertains to a fuel and air mixture expanding and preheating system which utilizes heated automatic transmission fluid as a heat source to facilitate vaporization of fuel in an air stream prior to induction into an internal combustion intake manifold.

2. Description of the Prior Art

Various types of fuel and air mixture expanding and preheating systems are known in the prior art. A typical example of such a fuel and air mixture expanding and preheating system is to be found in U.S. Pat. No.3,221,719, which issued to W. Ulrich on Dec. 7, 1965. This patent discloses the use of hot exhaust products from an internal combustion engine to preheat a fuel and air mixture. U.S. Pat. No. 3,872,849, which issued to F. Chester et al on Mar. 25, 1975, discloses an engine fuel vaporizer which includes an engine exhaust gas crossover passage located in the intake manifold directly beneath the carburetor throttle riser bore. A thin sheet metal tube quickly radiates and transfers heat to liquid fuel and fuel droplets in the air fuel mixture. U.S. Pat. No. 4,029,065, which issued to K. Wood on June 14, 1977, discloses a method and apparatus for improving the efficiency of gasoline engines by passing the air and fuel mixture from the vicinity of carburetor nozzles through a heat exchanger and causing liquid from the cooling system of the engine to flow through the heat exchanger and provide heat therefor. U.S. Pat. No. 4,086,893, which issued to G. Bernecker on May 2, 1978, discloses a carburetor for an internal combustion engine including a housing having porous matter contained therein and including a plurality of nozzles for injecting fuel into the housing and onto the porous matter to effect complete vaporization of the fuel. The engine's cooling water is utilized as a heat source to preheat the fuel prior to induction into the carburetor. U.S. Pat. No. 4,194,476, which issued to C. Lombardi et al on Mar. 25, 1980, discloses an otto cycle engine in which an air and fuel mixture is supplied through a heat exchanger heated by engine exhaust gasses.

While the above mentioned devices are directed to fuel and air mixture expanding and preheating systems for various internal combustion engines, none of these devices disclose the use of automatic transmission fluid as a heat source. Additional features of the present invention, not contemplated by the aforesaid prior art devices include the provision of a heat exchanger body having an internal transmission fluid reservoir having a hollow spiral fin extending along the length of the reservoir and in fluid communication therewith. Inasmuch as the art is relatively crowded with respect to these various types of fuel and air mixture expanding and preheating systems, it can be appreciated that there is a continuing need for and interest in improvements to such fuel and air mixture expanding and preheating systems, and in this respect, the present invention addresses this need and interest.

SUMMARY OF THE INVENTION

In view of the foregoing disadvantages inherent in the known types of fuel and air mixture expanding and preheating systems now present in the prior art, the present invention provides an improved fuel and air mixture expanding and preheating system. As such, the general purpose of the present invention, which will be described subsequently in greater detail, is to provide a new and improved fuel and air mixture expanding and preheating system which has all the advantages of the prior art fuel and air mixture expanding and preheating systems and none of the disadvantages.

To attain this, a representative embodiment of the concepts of the present invention is illustrated in the drawings and makes use of a fuel and air mixture expanding and preheating system, for use in a vehicle having an internal combustion engine, an intake manifold, a carburetor, an automatic transmission and a transmission fluid cooler, which includes a heat exchanger body having a first mounting plate dimensioned for attachment to the vehicle and a second mounting plate dimensioned for attachment to the intake manifold. A heating fluid inlet of the heat exchanger body is dimensioned for connection to a heated automatic transmission fluid line of the vehicle, between the automatic transmission and the transmission fluid cooler. A heating fluid outlet of the heat exchanger body is dimensioned for connection to a transmission fluid cooler inlet of the vehicle. A throttle valve is mounted in an outlet portion of the heat exchanger body, adjacent the intake manifold mounting plate. In use, the fuel and air mixture from the carburetor is heated and expanded in the heat exchanger body prior to induction into the intake manifold of the internal combustion engine. The heat is extracted from the automatic transmission fluid of the vehicle, resulting in a cooler operating temperature for the vehicle transmission. The heat exchanger body includes an internal fluid reservoir having a hollow spiral fin in fluid communication with the reservoir. The fuel and air mixture is thus forced to follow a helical flow path in the heat exchanger body for maximum heat transfer efficiency.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fuel and air mixture expanding and preheating system which has all the advantages of the prior art fuel and air mixture expanding and preheating systems and none of the disadvantages.

It is another object of the present invention to provide a new and improved fuel and air mixture expanding and preheating system which may be easily and efficiently manufactured and marketed.

It is a further object of the present invention to provide a new and improved fuel and air mixture expanding and preheating system which is of a durable and reliable construction.

An even further object of the present invention is to provide a new and improved fuel and air mixture expanding and preheating system which is susceptible of a low cost of manufacture with regard to both materials and labor, and which accordingly is then susceptible of low prices of sale to the consuming public, thereby making such fuel and air mixture expanding and preheating systems economically available to the buying public.

Still yet another object of the present invention is to provide a new and improved fuel and air mixture expanding and preheating system which provides in the apparatuses and methods of the prior art some of the advantages thereof, while simultaneously overcoming some of the disadvantages normally associated therewith.

Still another object of the present invention is to provide a new and improved fuel and air mixture expanding and preheating system for producing more efficient operation of an internal combustion engine.

Yet another object of the present invention is to provide a new and improved fuel and air mixture expanding and preheating system for reducing the operating temperature of a vehicle automatic transmission while simultaneously producing an increased engine operating efficiency.

Even still another object of the present invention is to provide a new and improved fuel and air mixture expanding and preheating system which may be easily retrofitted onto conventional vehicle engines.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
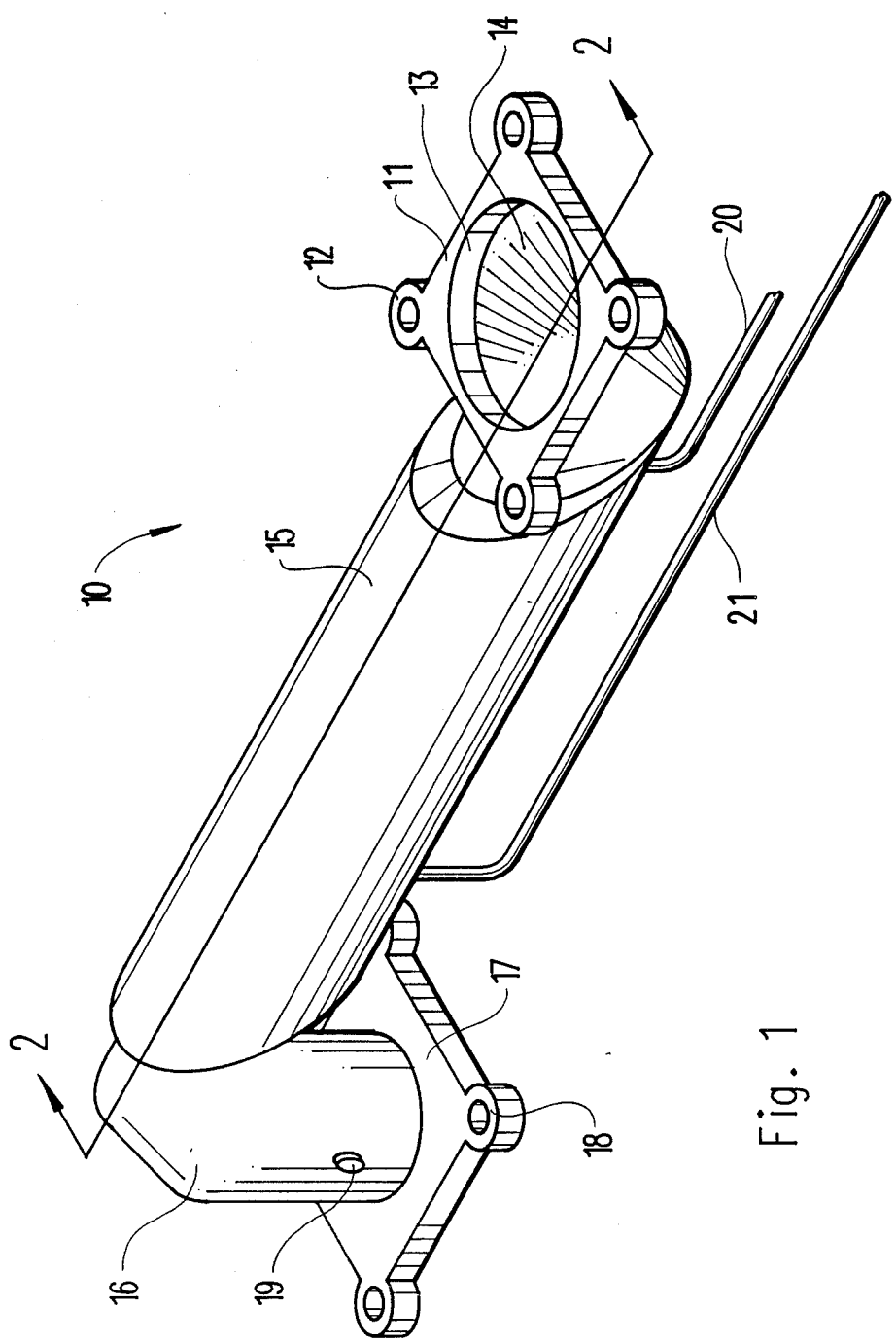
FIG. 1 is a perspective view of the fuel and air mixture expanding and preheating system of the present invention.

With reference now to the drawings, and in particular to FIG. 1 thereof, a new and improved fuel and air mixture expanding and preheating system embodying the principles and concepts of the present invention and generally designated by the reference numeral 10 will be described.

More specifically, it will be noted that the first embodiment 10 of the invention includes a heat exchanger body 15, in the form of an elongated generally cylindrical tube. A first mounting plate 11 is provided at one end of the body 15 and is dimensioned for mounting a conventional carburetor of a vehicle internal combustion engine. The mounting plate 11 includes a plurality of threaded mounting bosses 12 for engagement with carburetor mounting bolts. A central circular aperture 13 is formed through the plate 11 and communicates through a tapered inlet 14 with an interior passage formed through the heat exchanger body 15. A second mounting plate 17 is provided at an opposite end of the heat exchanger body 15 and is connected thereto by an outlet conduit 16. A transverse pivotal shaft 19 mounts an interior butterfly type valve, which is utilized as a throttle valve. The mounting plate 17 is dimensioned for engagement with a conventional intake manifold of an internal combustion engine, and includes a plurality of apertured mounting bosses 18, for the reception of conventional mounting bolts. A heating fluid inlet 20 is adapted for connection between the heated fluid outlet of a conventional vehicle automatic transmission and a conventional automatic transmission cooler. A heating fluid outlet 21 is connected to the vehicle automatic transmission fluid cooler.

Figure 2:
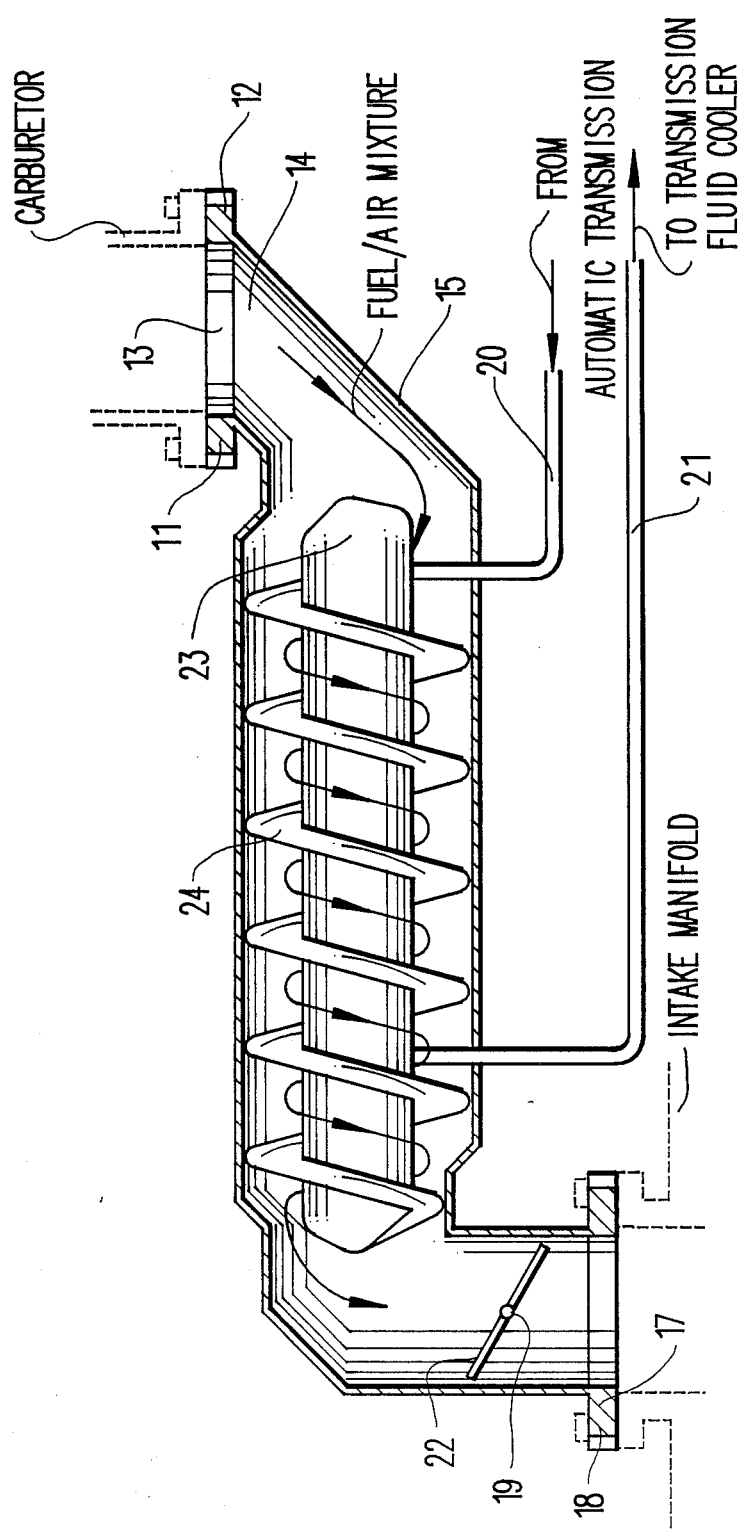
FIG. 2 is a cross sectional view, further illustrating the construction of the present invention.

As shown in FIG. 2, a fuel air mixture travels from a vehicle carburetor through the central aperture 13 in the mounting plate 11 and into the interior of the heat exchanger body 15. An elongated generally cylindrical reservoir 23 is disposed in coaxial relation within the body 15 and includes a hollow spiral fin 24. The fuel air mixture is thus forced to travel in a helical flow path around the reservoir 23, and along the entire length of the heat exchanger body 15. A butterfly type throttle valve 22 is mounted on the transverse pivotal shaft 19, and is utilized to control the induction of the fuel air mixture into the vehicle engine intake manifold. The heating fluid inlet 20 is connected to the vehicle automatic transmission, and inducts heated transmission fluid into the interior of the reservoir 23. The fluid outlet 21 returns the transmission fluid from the reservoir 23 to the conventional vehicle transmission fluid cooler for a further cooling period. It should be noted that the temperature of the transmission fluid will be considerably reduced from the inlet 20 to the outlet 21. Thus, in addition to effectively preheating and vaporizing the fuel air mixture prior to induction into the intake manifold, the device of the present invention is also operative to reduce the operating temperature of the vehicle automatic transmission.

Figure 3:
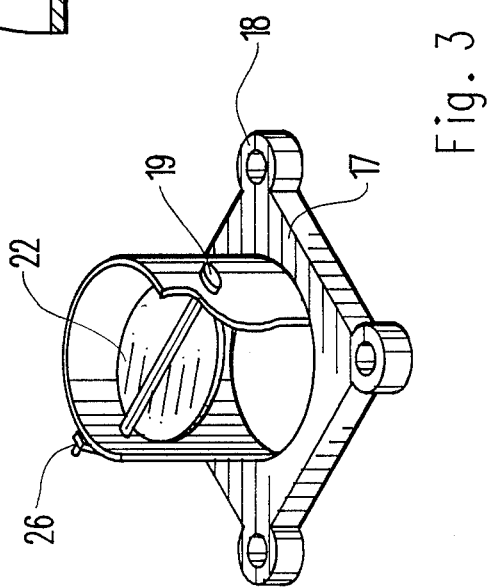
FIG. 3 is a perspective detail view illustrating throttle valve and intake manifold attachment mounting plate.

FIG. 3 is a perspective view which illustrates the details of the throttle valve 22, mounted adjacent the intake manifold attachment plate 17. The throttle valve 22 includes an operating lever 26, for attachment in a conventional manner to an accelerator linkage cable.

Figure 4:
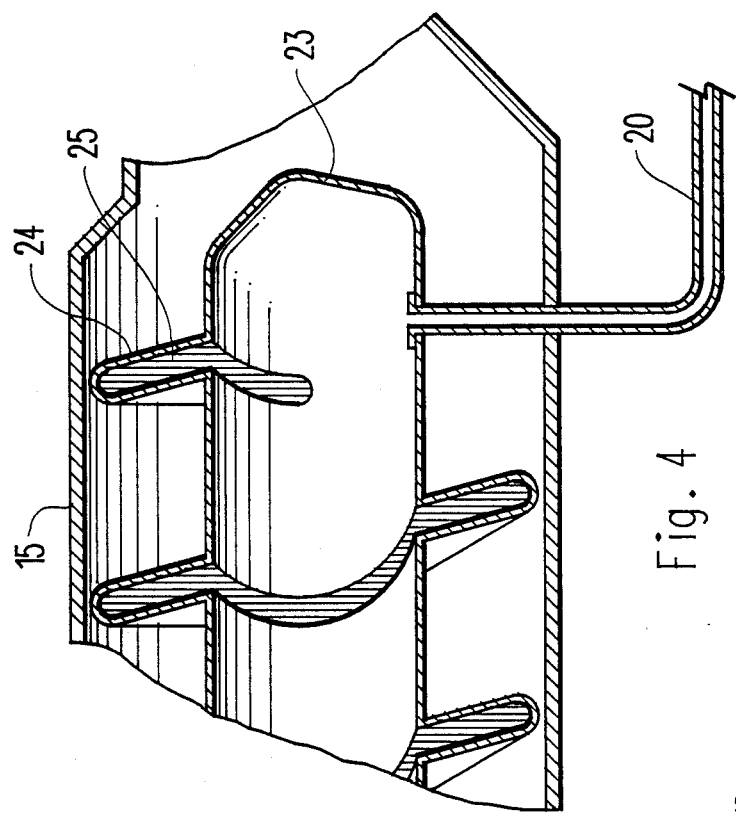
FIG. 4 is a partial cross sectional detail view illustrating the details of the heat exchanger fin construction.

As shown in FIG. 4, the spiral fin 24 extending along and around the reservoir body 23 has a hollow interior 25 which is in fluid communication with the reservoir 23. This construction provides a maximum surface area for a maximum heat transfer efficiency. The various components of the present invention are preferably formed from a highly heat conductive material, such as aluminum or copper. The mounting plate portions 11 and 17 may be formed from a high strength steel material. Similarly, the outer heat exchanger body portion 15 may be formed from a high strength steel material, while the internal reservoir 23 and spiral fin 24 may be formed from an aluminum or copper material.

As may now be understood, the theory of the present invention is based on using available heat from the automatic transmission fluid to preheat gas and air by using the vehicle automatic transmission's own pumping system. The fluid is pumped by the conventional transmission pump into the reservoir 23 and is then returned to the conventional existing transmission fluid cooling system. Using the transmission fluid as a heat source results in reduced transmission operating temperatures and a resultant increase in transmission life. The fuel and air mixture are induced through the carburetor and into the heat exchanger body 15. Because of the backing created by the engine intake manifold, the fuel and air mixture is drawn through and forced to swirl and mix as it travels along the spiral fin 24, at the same time gathering heat from the reservoir 23. When the heating process is complete, the fuel and air mixture is expanded and vaporized, thus resulting in a more efficient burning of the fuel, lower emissions, better fuel economy and a cooler running and longer lasting engine. The throttle control valve 22 is used in conjunction with the existing carburetor throttle valves, to not only control the amount of fuel going into the engine, but to also prevent backfire from damaging the heat exchanging unit. While not illustrated, additional filter screens of a fine mesh may be provided in the heat exchanger flow path as a further protection against the induction of foreign particles into the internal components of the engine. In summary, the present invention achieves an increase in fuel mileage, a reduction in pollution emissions, an increase in engine life and an increase in transmission life.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A fuel and air mixture expanding and preheating system, comprising:
   a heat exchanger body;
   a first mounting plate at one end of said body dimensioned for mounting a carburetor of an internal combustion engine;
   a second mounting plate at an opposite end of said body dimensioned for attachment to an intake manifold of an internal combustion engine;
   a heating fluid inlet of said heat exchanger adapted for connection to an automatic transmission fluid line of a vehicle transmission;
   and
   a heating fluid outlet of said heat exchanger adapted for connection to an inlet of a transmission fluid cooler of a vehicle, whereby a fuel and air mixture from a vehicle carburetor is heated and expanded in said heat exchanger body prior to induction into an intake manifold.

2. The fuel and air mixture expanding and preheating system of claim 1, further comprising an internal reservoir in said heat exchanger body connected to said heating fluid inlet and outlet.

3. The fuel and air mixture expanding and preheating system of claim 2, further comprising a spiral fin extending around said reservoir for directing a fuel and air mixture in a helical flow path around said reservoir.

4. The fuel and air mixture expanding and preheating system of claim 3, wherein said spiral fin is hollow and in fluid communication with said reservoir.

5. In combination with a vehicle having an internal combustion engine, an intake manifold, a carburetor, an automatic transmission, and a transmission fluid cooler, the improvement comprising:
   a heat exchanger body;
   a first mounting plate at one end of said body dimensioned for mounting a carburetor of an internal combustion engine;
   a second mounting plate at an opposite end of said body dimensioned for attachment to an intake manifold of an internal combustion engine;
   a heating fluid inlet of said heat exchanger adapted for connection to an automatic transmission fluid line of a vehicle transmission;
   and
   a heating fluid outlet of said heat exchanger adapted for connection to an inlet of a transmission fluid cooler of a vehicle, whereby a fuel and air mixture from a vehicle carburetor is heated and expanded in said heat exchanger body prior to induction into an intake manifold.

6. The combination of claim 5, further comprising an internal reservoir in said heat exchanger body connected to said heating fluid inlet and outlet.

7. The combination of claim 6, further comprising a spiral fin extending around said reservoir for directing a fuel and air mixture in a helical flow path around said reservoir.

8. The combination of claim of claim 7, wherein said spiral fin is hollow and in fluid communication with said reservoir.

9. The combination of claim 5, further comprising a throttle valve in an outlet of said heat exchanger body adjacent said second mounting plate.

10. A method of expanding and preheating a fuel and air mixture in a vehicle having an internal combustion engine, an intake manifold, an automatic transmission, and an automatic transmission fluid cooler, comprising the steps of:

providing:
- a heat exchanger body;
- a first mounting plate at one end of said body dimensioned for mounting said carburetor;
- a second mounting plate at an opposite end of said body dimensioned for attachment to said intake manifold;
- a heating fluid inlet on said heat exchanger body;
- a heating fluid outlet on said heat exchanger body;

connecting said heat exchanger body between said carburetor and said intake manifold;

connecting said heating fluid inlet in a heated transmission fluid line between said transmission and said transmission fluid cooler; and connecting said heating fluid outlet to said transmission fluid cooler inlet.

11. The method of claim 10, further comprising the step of providing an internal reservoir in said heat exchanger body connected to said heating fluid inlet and outlet.

12. The method of claim 11, further comprising the step of providing a spiral fin extending around said reservoir for directing a fuel and air mixture in a helical flow path around said reservoir.

13. The method of claim 12, further comprising the step of providing a hollow spiral fin in fluid communication with said reservoir.

14. The method of claim 10, further comprising the step of providing a throttle valve in an outlet of said heat exchanger body adjacent said second mounting plate.

* * * * *